United States Patent [19]

Ikadai et al.

[11] Patent Number: 5,536,580
[45] Date of Patent: Jul. 16, 1996

[54] CONDUCTIVE ANTIREFLECTION FILM AND CONDUCTIVE ANTIREFLECTION GLASS

[75] Inventors: Masahiro Ikadai, Sagamihara; Kazuhiko Fujimaki, Mie-ken; Etsuo Ogino, Tsukaba; Yasunori Taninaka, Yokkaichi; Ayako Soejima, Tsukuba, all of Japan

[73] Assignee: Nippon Sheet Glass Co., Ltd., Osaka, Japan

[21] Appl. No.: 199,625

[22] Filed: Feb. 22, 1994

[30] Foreign Application Priority Data

Mar. 5, 1993 [JP] Japan ..................... 5-071252

[51] Int. Cl.$^6$ .................................. B32B 17/06
[52] U.S. Cl. .................. 428/428; 428/216; 428/432; 428/433; 428/696; 428/697; 428/699; 428/701; 428/702; 359/359; 359/360; 359/585; 359/586
[58] Field of Search .................. 428/428, 432, 428/433, 216, 696, 697, 699, 701, 702; 359/359, 360, 585, 586

[56] References Cited

U.S. PATENT DOCUMENTS

| | | | |
|---|---|---|---|
| 4,261,645 | 4/1981 | Sawamura | 359/586 |
| 4,422,721 | 12/1983 | Hahn | 359/585 |
| 5,085,926 | 2/1992 | Iida | 359/360 |
| 5,168,003 | 12/1992 | Proscia | 359/586 |

FOREIGN PATENT DOCUMENTS

| | | |
|---|---|---|
| 59-90801 | 5/1984 | Japan . |
| 4-15443 | 3/1992 | Japan . |

*Primary Examiner*—Ellis P. Robinson
*Assistant Examiner*—Timothy M. Speer
*Attorney, Agent, or Firm*—Woodcock Washburn Kurtz Mackiewicz & Norris

[57] ABSTRACT

In a conductive antireflection film having predetermined optical characteristics, of the layers of the conductive antireflection film, two layers located on the transparent substrate side are replaced with a three-layered film having a metal oxide film as an intermediate layer thereof. In this three-layered film, when $k_i = 4n_i d_i / \lambda_0$ (where $n_i$ is the refractive index of the ith layer, di is the geometric thickness of the ith layer, and $\lambda_0$ is a middle wavelength in design), the metal oxide film as the second layer satisfies $k_2 \geq 0.01$, and an ITO film as the first layer satisfies $k_1 \geq 0.1$.

5 Claims, 17 Drawing Sheets

CONDUCTIVE ANTIREFLECTION FILM AND CONDUCTIVE ANTIREFLECTION GLASS

BACKGROUND OF THE INVENTION

1. Field of the Invention

The present invention relates to a conductive antireflection film stacked on a transparent substrate to reduce reflection of light by the surface of the transparent substrate.

2. Description of the Prior Art

In a CRT of a television receiver or the like, a conductive antireflection film is used to prevent an image from being obscured by reflection of external light or prevent an electric discharge from occurring between the CRT and a human body or the like owing to charging during an operation.

As such a conductive antireflection film, the present applicant proposed a four-layered conductive antireflection film in Japanese Patent Publication No. 4-15443. This film is formed by sequentially stacking an ITO layer, an $MgF_2$ film, a $TiO_2$ compound film and an $MgF_2$ film on a transparent substrate in the order named.

The basic arrangement of the four-layered conductive antireflection film will be described below. Letting $n_i$ be the refractive index of the ith layer $d_i$ is the geometric thickness of the ith layer and $k_i$ is the value obtained by dividing an optical film thickness $(n_i d_i)$ by a ¼ wavelength $(\lambda_0/4)$, the following equation can be established:

$$k_i = 4n_i d_i / \lambda_0$$

$\lambda_0$ is the middle wavelength in design. If the value obtained by letting the value $k_i$ contain an incident angle $\Theta$ as a parameter is represented by $\delta_i$, then $$\delta_i = 2\pi n_i d_i \cos\Theta / \lambda_0$$

In this case, as indicated by "Prior Art" in Table 1, the optimal basic arrangement of a film that satisfies required optical and electrical characteristics are designed such that the k values of the first to fourth layers are defined as follows: $k_1=0.38$, $k_2=0.27$, $k_3=2.10$ and $k_4=1.00$, provided that a first layer 31 as an ITO layer, a second layer 32 as an $MgF_2$ film, a third layer 33 as a $TiO_2$ compound film and a fourth layer 34 as an $MgF_2$ film are stacked on a transparent substrate 10 in the order named, as shown in FIG. 1.

The preferable ranges of these k values are:

$0.93 \leq k_4 \leq 1.05$ $1.97 \leq k_3 \leq 2.15$ $0.25 \leq k_2 \leq 0.37$ $0.34 \leq k_1 \leq 0.50$ Note that the film thickness range of a given layer is determined as an allowable film thickness range based on the assumption that the thicknesses of the remaining layers are accurately controlled within the respective film thickness ranges defined in the basic arrangement of the film.

FIG. 2 shows the spectral reflectance of the conventional film shown in Table 1. Note that the film arrangements in Tables 1 and 2 are expressed by the k values. As is apparent from FIG. 2, in the wavelength range of about 430 nm to 680 nm, the reflectance is 0.3% or less, exhibiting excellent optical characteristics. In addition, the sheet resistance is 300 Ω/□ or less, exhibiting excellent electrical characteristics.

Although the above-described conventional film has excellent optical and electrical characteristics, the film is scratched by a load of 300 gf in a scratch test using the tip of a mechanical pencil as a test indenter.

SUMMARY OF THE INVENTION

The first conductive antireflection film of the present invention comprises a first layer composed of an ITO film which is stacked on a surface of a transparent substrate to satisfy $0.1 \leq k_i$ when $k_i = 4n_i d_i / \lambda_0$ where $n_i$ is a refractive index of an ith layer, $d_i$ is a geometric thickness of the ith layer, and $\lambda_0$ is a middle wavelength in design, a second layer composed of a metal oxide film which is stacked on the first layer to satisfy $0.01 \leq k_2$ and is transparent in a visible region, a third layer composed of an $MgF_2$ film stacked on the second layer, a fourth layer stacked on the third layer to satisfy $1.97 \leq k_4 \leq 2.15$, and a fifth layer stacked on the fourth layer to satisfy $0.93 \leq l_5 \leq 1.05$, wherein a reflectance in a wavelength range of 430 nm to 650 nm is not more than 0.3%.

In the first conductive antireflection film having such an arrangement, the sequentially stacked first to fifth layers have a predetermined relationship, while the second layer satisfies $k_2 \geq 0.01$ and the first layer satisfies $k_1 \geq 0.01$, so that a higher film strength than that of the conventional film can be obtained while excellent optical and electrical characteristics are maintained.

The second conductive antireflection film of the present invention comprises a first layer composed of an ITO film which is stacked on a surface of a transparent substrate to satisfy $0.1 \leq k_1$ when $k_i = 4n_i d_i / \lambda_0$ where $n_i$ is a refractive index of an ith layer, $d_i$ is a geometric thickness of the ith layer, and $\lambda_0$ is a middle wavelength in design, a second layer composed of a metal oxide film which is stacked on the first layer to satisfy $0.01 \leq k_2$ and is transparent in a visible region, a third layer composed of an $MgF_2$ film stacked on the second layer, a fourth layer stacked on the third layer to satisfy $0.70 \leq k_4 \leq 0.80$, a fifth layer stacked on the fourth layer to satisfy $0.18 \leq k_5 \leq 0.24$, a sixth layer stacked on the fifth layer to satisfy $0.68 \leq k_6 \leq 0.80$, and a seventh layer stacked on the sixth layer to satisfy $1.02 \leq k_7 \leq 1.12$, wherein a reflectance in a wavelength range of 430 nm to 650 nm is not more than 0.3%.

In the second conductive antireflection film having such an arrangement, the sequentially stacked first to seventh layers have a predetermined relationship, while the second layer satisfies $k_2 \geq 0.01$ and the first layer satisfies $k_1 \geq 0.1$, so that a higher film strength than that of the conventional film can be obtained while excellent optical and electrical characteristics are maintained.

In such a conductive antireflection film of the present invention, a two-layered film of a basic arrangement having predetermined optical characteristics on the transparent substrate side is replaced with a three-layered film having an optical admittance equivalent to that of the two-layered film, and this three-layered film is constituted by an ITO layer located on the transparent substrate side, a transparent metal oxide layer stacked on the ITO layer and an $MgF_2$ layer stacked on the metal oxide layer. By setting the k value of the ITO layer to be larger than a predetermined value, an antistatic function can be obtained. In addition, by setting the k value of the metal oxide film to be larger than a predetermined value, scratching can be prevented even with a load of 300 gf. Therefore, the required optical characteristics, electrical characteristics and film strength can be achieved at the same time.

DETAILED DESCRIPTION OF THE PREFERRED EMBODIMENTS

Figure 1:
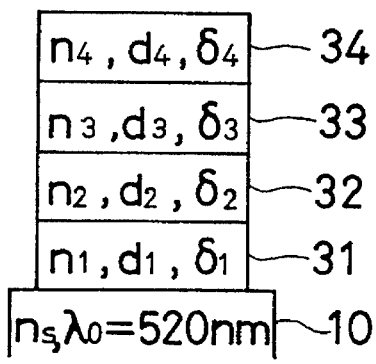
FIG. 1 is a view showing the basic film arrangement of a conventional four-layered conductive antireflection film.
Figure 2:
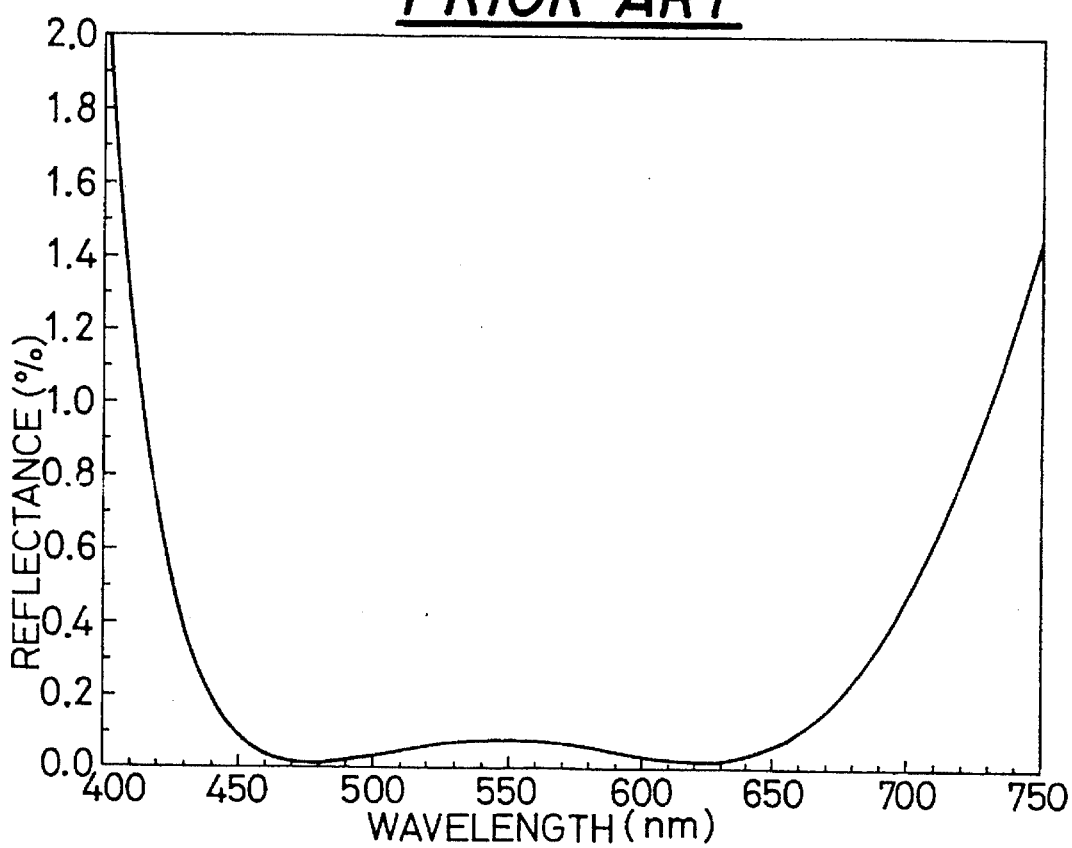
FIG. 2 is a graph showing the spectral reflectance of the conventional film.
Figure 3:
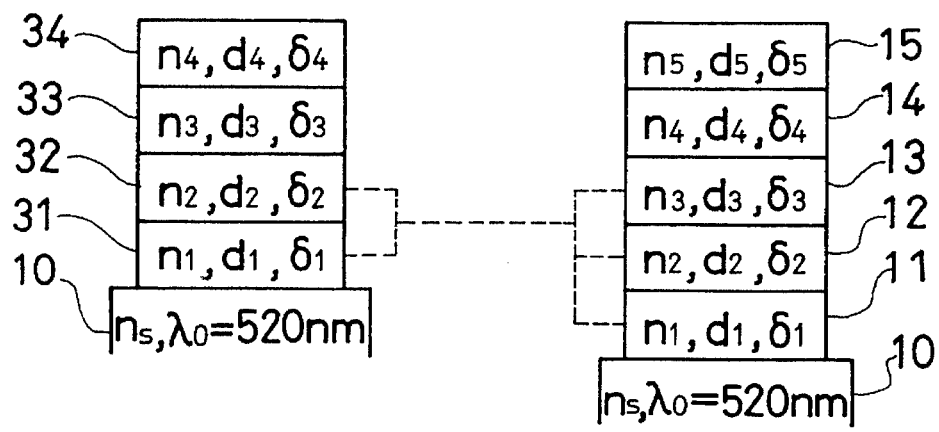
FIG. 3 is a view for explaining a five-layered conductive antireflection film according to the first embodiment of the preset invention.

Embodiments of the present invention will be described below with reference to the accompanying drawings. As shown in FIG. 3, a five-layered conductive antireflection film according to the first embodiment of the present invention is constituted by first to fifth layers 11 to 15 sequentially stacked on a transparent substrate 10 in the order named.

This five-layered conductive antireflection film is designed such that an optical admittance almost equivalent to that of the first and second layers 31 and 32 of the above-described basic arrangement of the four-layered conductive antireflection film is realized by three layers including an adhesive layer, i.e., a first layer 11, a second layer (adhesive layer) 12, and a third layer 13.

If the equivalent optical admittance of the first and second layers 31 and 32 of the four-layered conductive antireflection film is represented by $Y_4$, then $$Y_4 = C/B$$

In this case, B and C are expressed as follows:

$$\begin{bmatrix} B \\ C \end{bmatrix} = M_2 M_1 \begin{bmatrix} 1 \\ n_s \end{bmatrix}$$

where $n_s$ is the refractive index of the transparent substrate 10 consisting of transparent glass.

Note that $M_i$ in this equation is the characteristic matrix of the ith layer of the conductive antireflection film and is expressed as follows:

$$M_i = \begin{bmatrix} \cos\delta_i & i\sin\delta_i/n_i \\ in_i\sin\delta_i & \cos\delta_i \end{bmatrix}$$

If the optical admittance of the first to third layers 11 to 13 of the five-layered conductive antireflection film is represented by $Y_5'$ then $$Y_5 = C/B$$

In this case, B and C are expressed as follows:

$$\begin{bmatrix} B \\ C \end{bmatrix} = M_3 M_2 M_1 \begin{bmatrix} 1 \\ n_s \end{bmatrix}$$

The arrangement of the five-layered conductive antireflection film, therefore, can be determined by determining $\delta_3$ and $\delta_1$ (i.e., $n_3$, $d_3$, $n_1$ and $d_1$) such that $Y_5 = Y_4$ after the second layer as the adhesive layer is inserted.

In this case, the lower limit of the thickness of the adhesive layer is determined in consideration of film strength, whereas the upper limit of the thickness is determined in consideration of the sheet resistance (antistatic function) of an ITO layer. The reasons why this upper limit is determined in consideration of the sheet resistance (antistatic function) of the ITO layer are that the thickness of the ITO layer needs to be reduced to set the equivalent optical admittance as the thickness of the adhesive layer increases, and the lower limit of the thickness of the ITO film is determined in consideration of sheet resistance (antistatic function).

Figure 4:
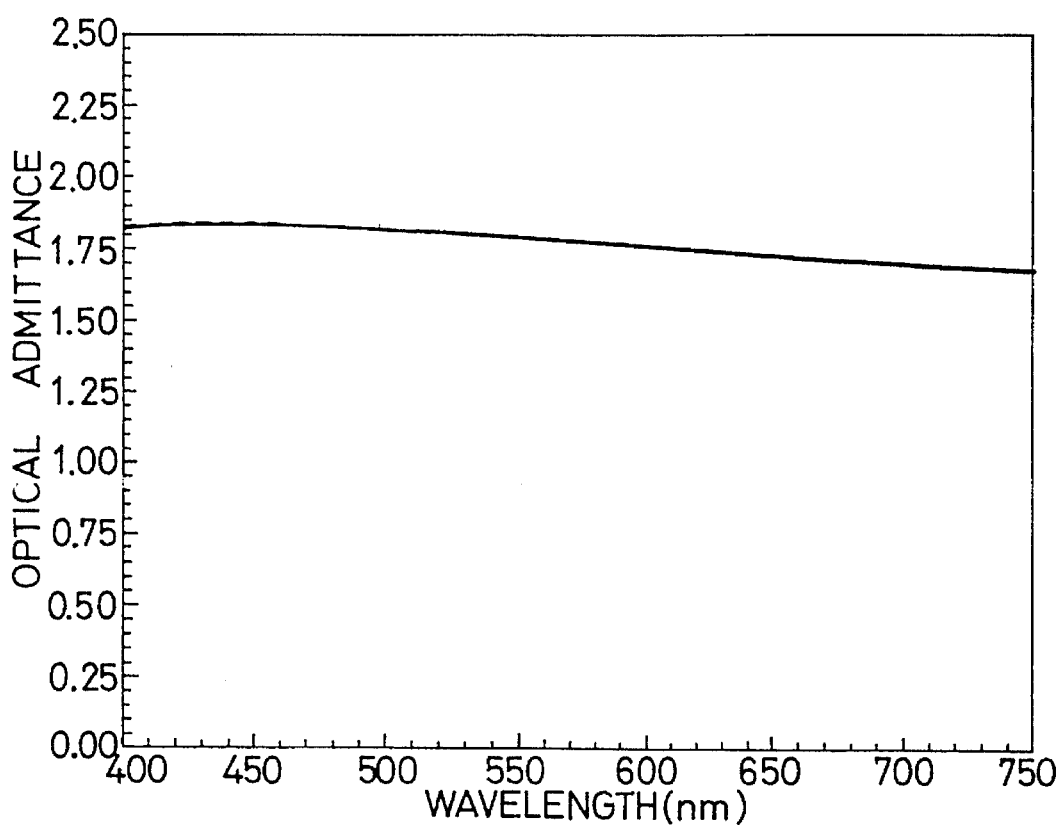
FIG. 4 is a graph showing the optical admittances of the conventional film and Example 3.
Figure 5:
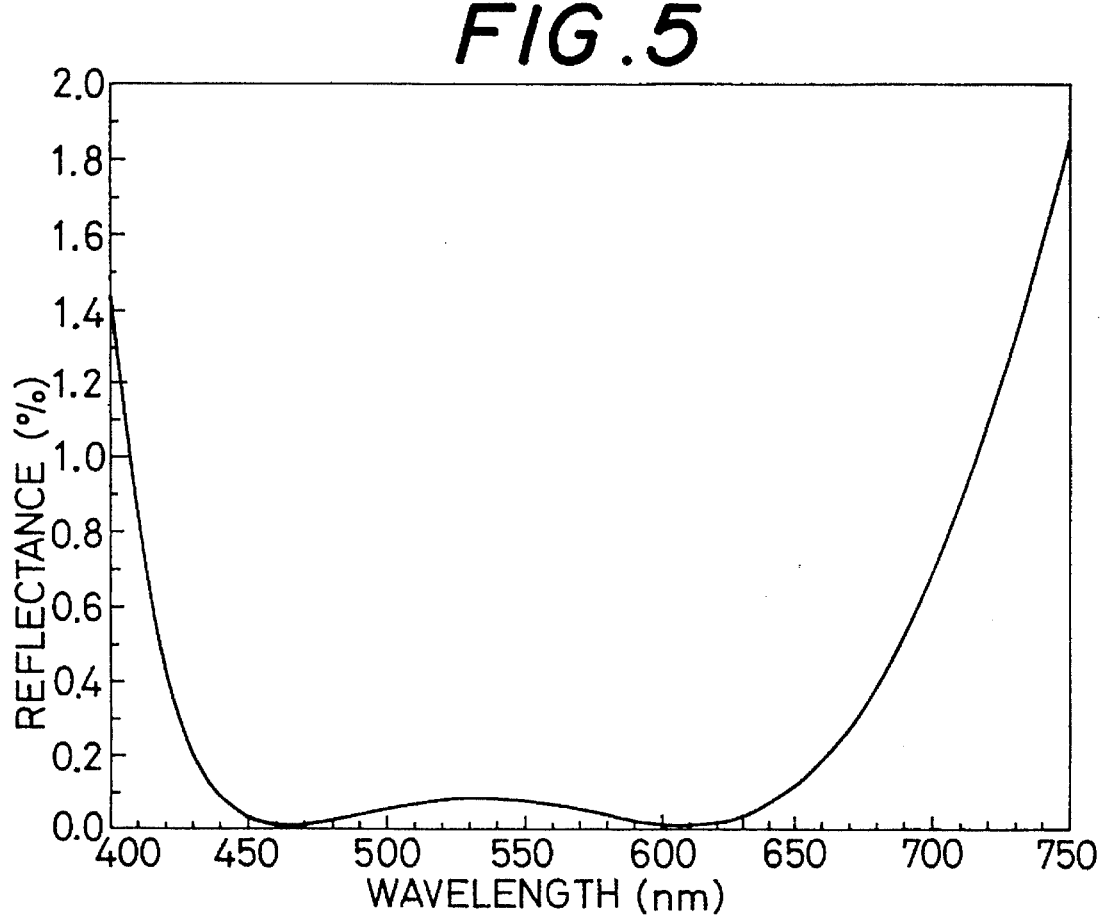
FIG. 5 is a graph showing the spectral reflectance of Example 1.
Figure 6:
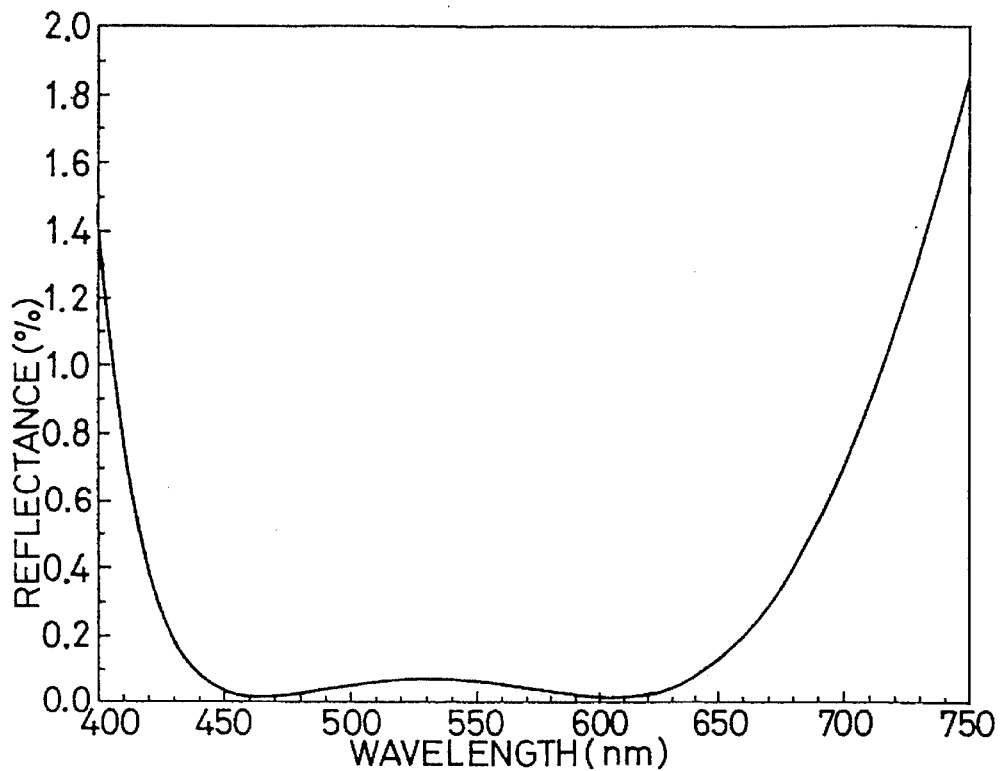
FIG. 6 is a graph showing the spectral reflectance of Example 2.
Figure 7:
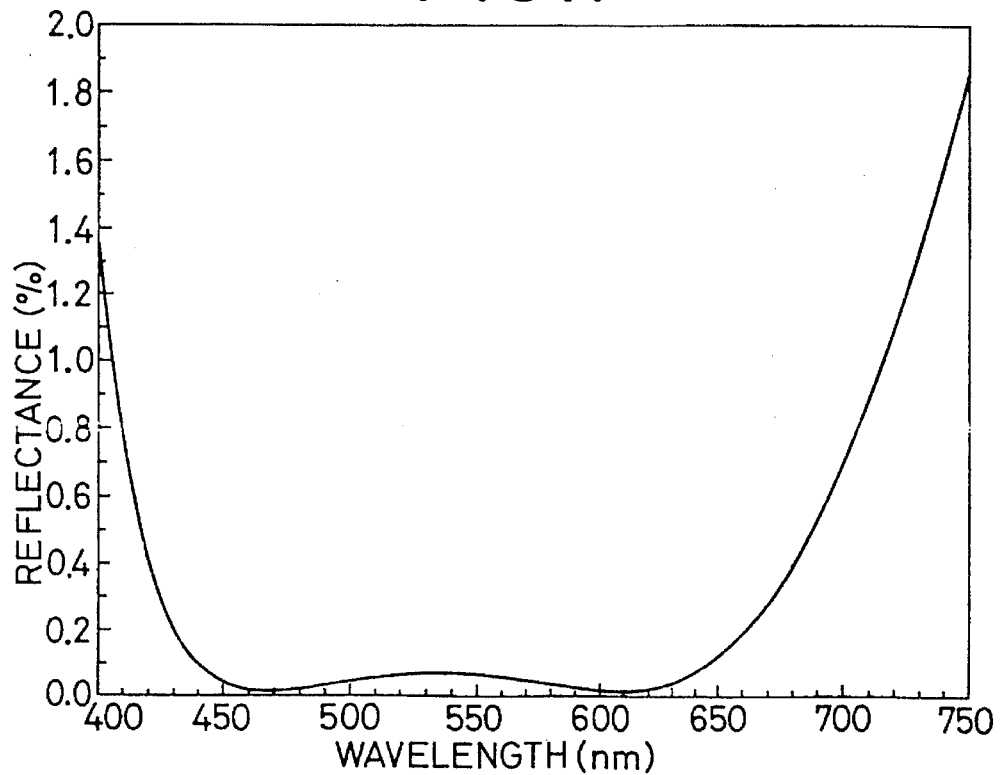
FIG. 7 is a graph showing the spectral reflectance of Example 3.
Figure 8:
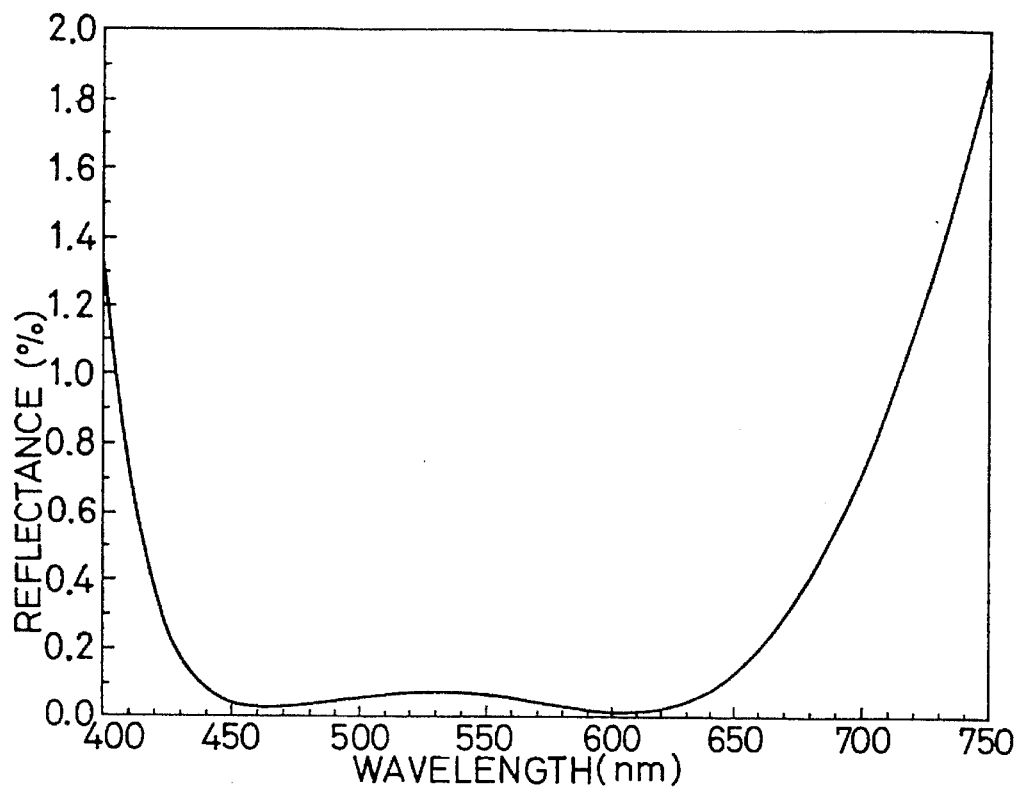
FIG. 8 is a graph showing the spectral reflectance of Example 4.
Figure 9:
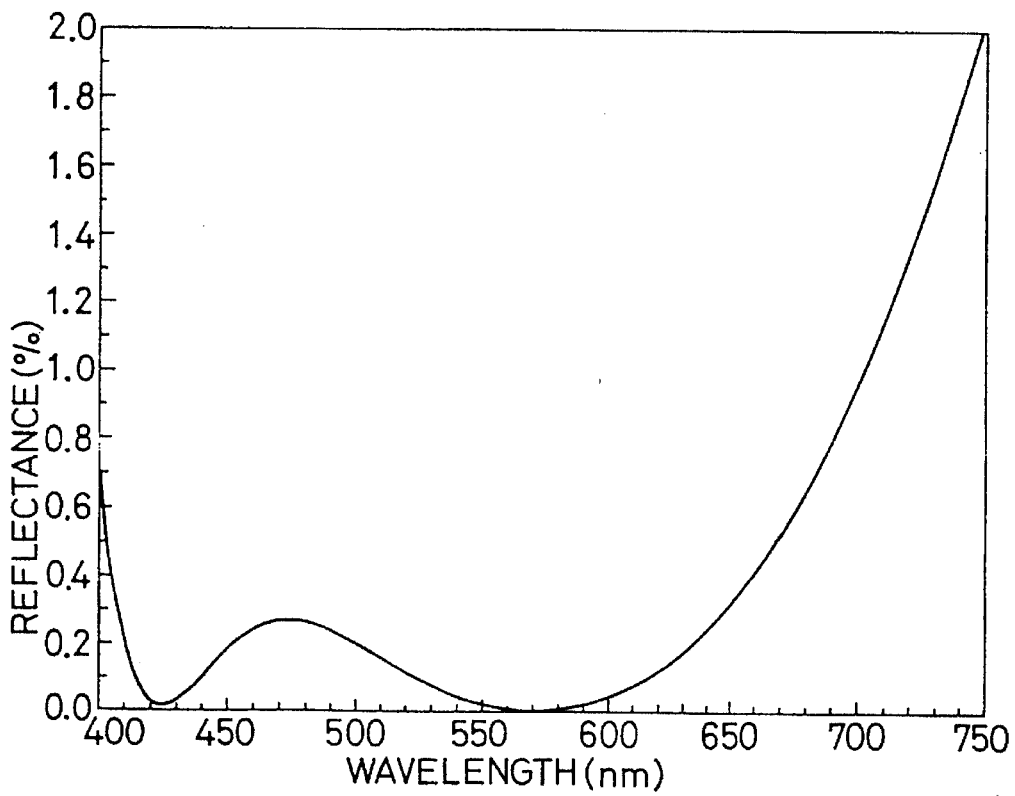
FIG. 9 is a graph showing the spectral reflectance of Example 5.
Figure 10:
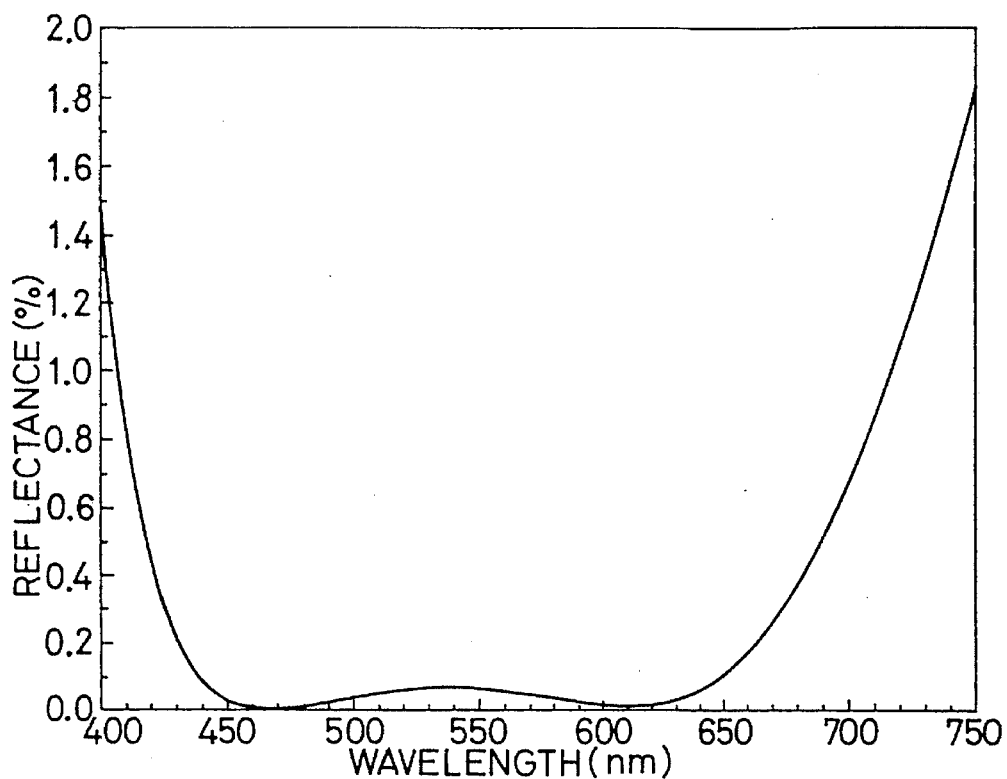
FIG. 10 is a graph showing the spectral reflectance of Example 6.
Figure 11:
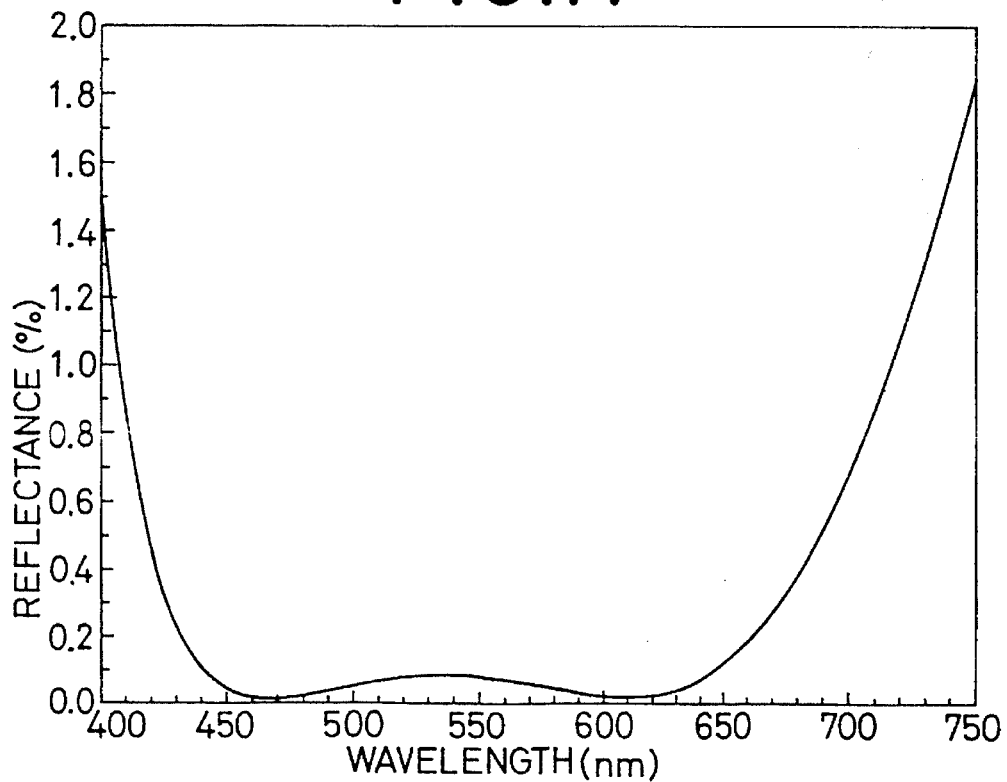
FIG. 11 is a graph showing the spectral reflectance of Example 7.
Figure 12:
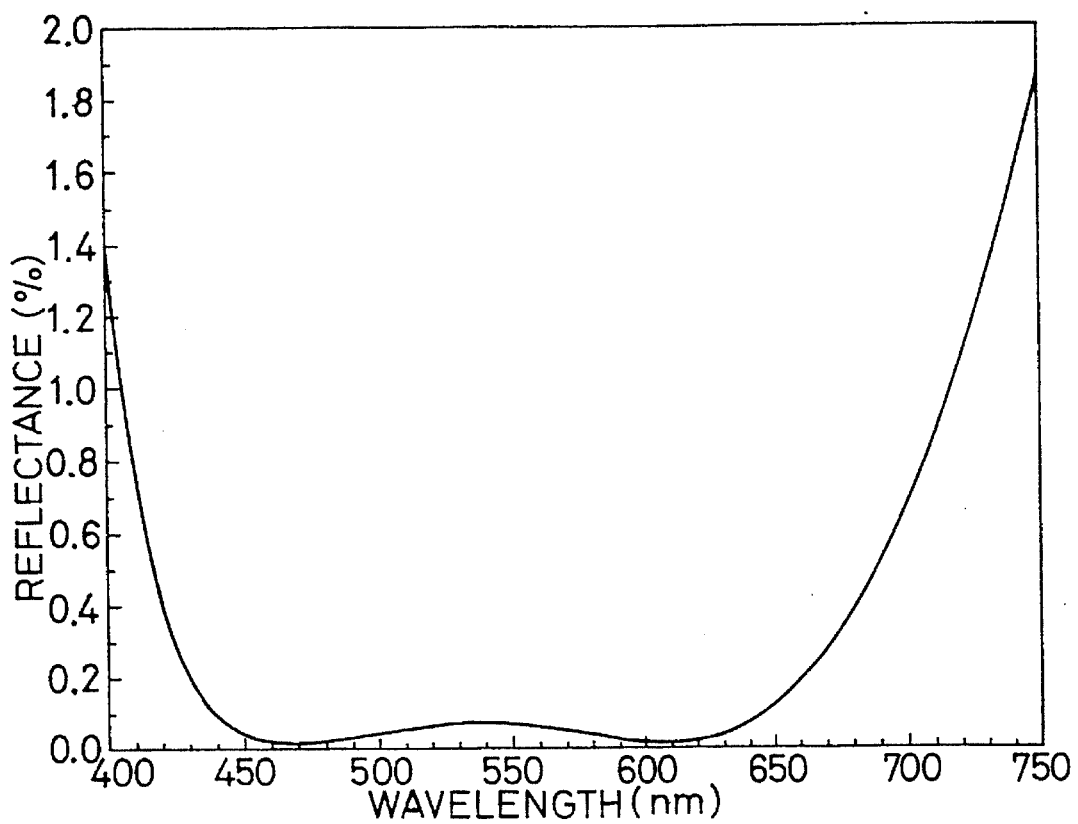
FIG. 12 is a graph showing the spectral reflectance of Example 8.

When the first and second layers 31 and 32 of the basic arrangement of the four-layered conductive antireflection film are replaced with three layers having an equivalent optical admittance in the above-described manner as shown in FIG. 3, and conditions to be described later are satisfied, a conductive antireflection film according to the first embodiment of the present invention can be obtained. FIG. 4 shows the optical admittances of the first and second layers of the conventional film and the first to third layers of Example 3 shown in Table 1. Referring to FIG. 4, the solid curve indicates the optical admittance of the first and second layers of the conventional film; and the broken curve, the optical admittance of the first to third layers of Example 3. These curves are superposed on each other. That is, these optical admittances are equivalent to each other.

Table 1 shows Examples 1 to 8 of the first embodiment, and Comparative Examples 1 to 3. Note that the numerical values of the respective film arrangements in Tables 1 and 2 are the $k_i$ values.

In Table 1, in the item "Electrical Characteristics", "⊚" indicates a film having a sheet resistance of 300 Ω/□ or less, and "○" indicates a film having a sheet resistance of 300 Ω/□ or more but having an antistatic function.

In addition, in the item "Film Strength", "⊚" indicates a film which is not scratched by a load of 500 gf in a scratch test using the tip of a mechanical pencil as a test indenter, and "○" indicates a film which is scratched by a load of 500 gf but is not scratched by a load of 300 gf.

In the item "Optical Characteristics", "⊚" indicates a film which can realize a reflectance of 0.3% or less in at least a wavelength range of 430 nm to 650 nm, and "○" indicates a film which can almost realize a reflectance of 0.3% or less in the same wavelength range.

Each of Examples 1 to 5 uses a $PrTiO_3$ layer as the second layer 12 serving as the adhesive layer. Example 6 uses an $SiO_2$ layer as the second layer 12. Example 7 uses an $Al_2O_3$ layer as the second layer 12. Example 8 uses a $TiO_2$ layer as the second layer 12.

As is apparent from Table 1, each of Examples 1 to 8 has a high film strength while maintaining excellent optical and electrical characteristics. Note that FIGS. 5 to 12 respectively show the spectral reflectances of Examples 1 to 8.

In contrast to this, in Comparative Example 1, the k value of the fifth layer of Example 3 is set to be a small value of 0.92. According to Comparative Example 1, although excellent electrical characteristics and a high film strength can be obtained, a reflectance of 0.3% or less cannot be realized in the range of 430 nm to 650 nm. That is, Comparative Example 1 is inferior to Example 3 in terms of optical characteristics.

In Comparative Example 2, the k value of the first layer is set to be 0.07 so as to let the first to third layers have the equivalent optical admittance. According to Comparative Example 2, although excellent optical characteristics and a high film strength can be obtained, an antistatic function cannot be obtained because the sheet resistance cannot be reduced. That is, Comparative Example 2 is inferior to Examples 1 to 8 in terms of electrical characteristics.

Figure 13:
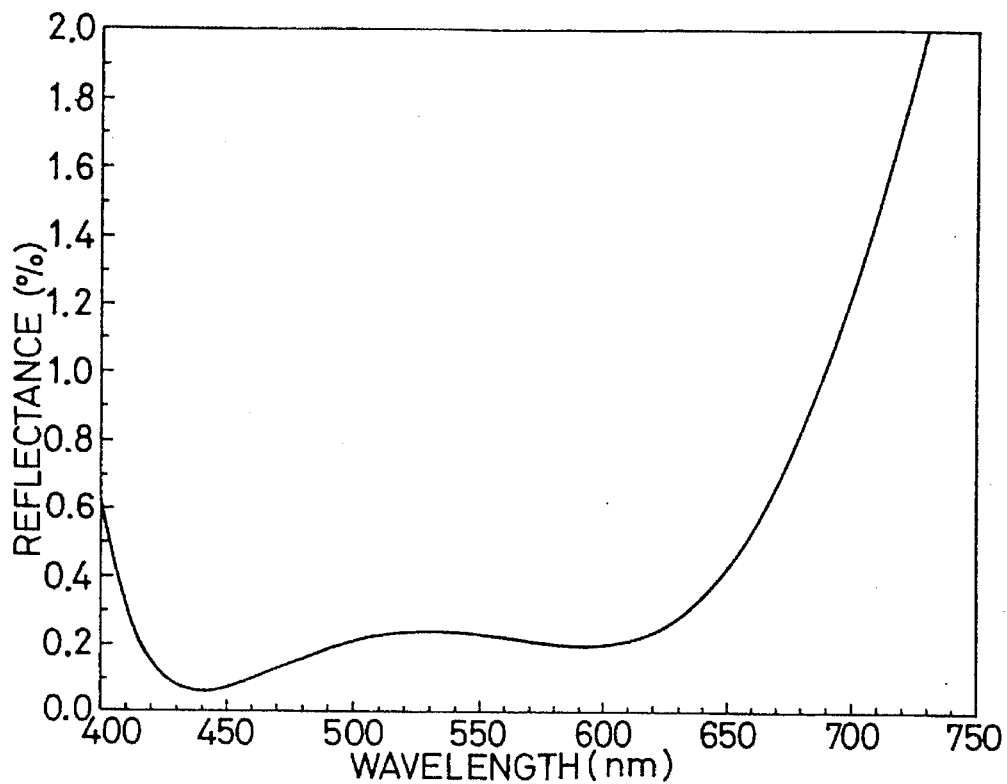
FIG. 13 is a graph showing the spectral reflectance of Comparative Example 1.
Figure 14:
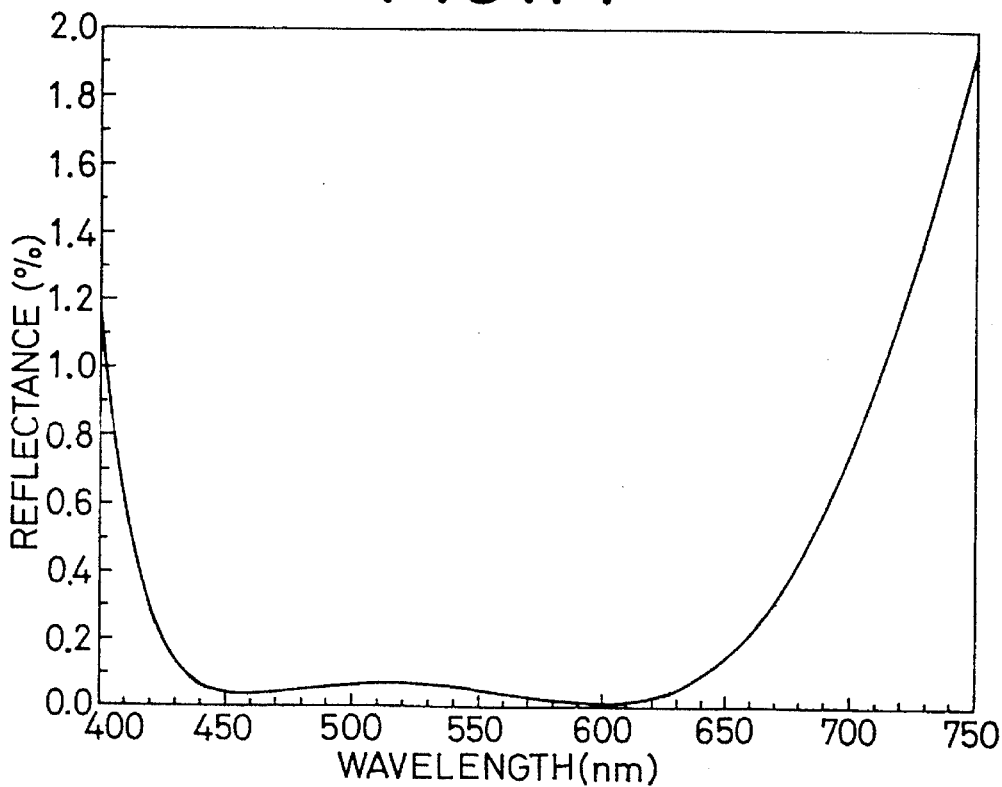
FIG. 14 is a graph showing the spectral reflectance of Comparative Example 2.
Figure 15:
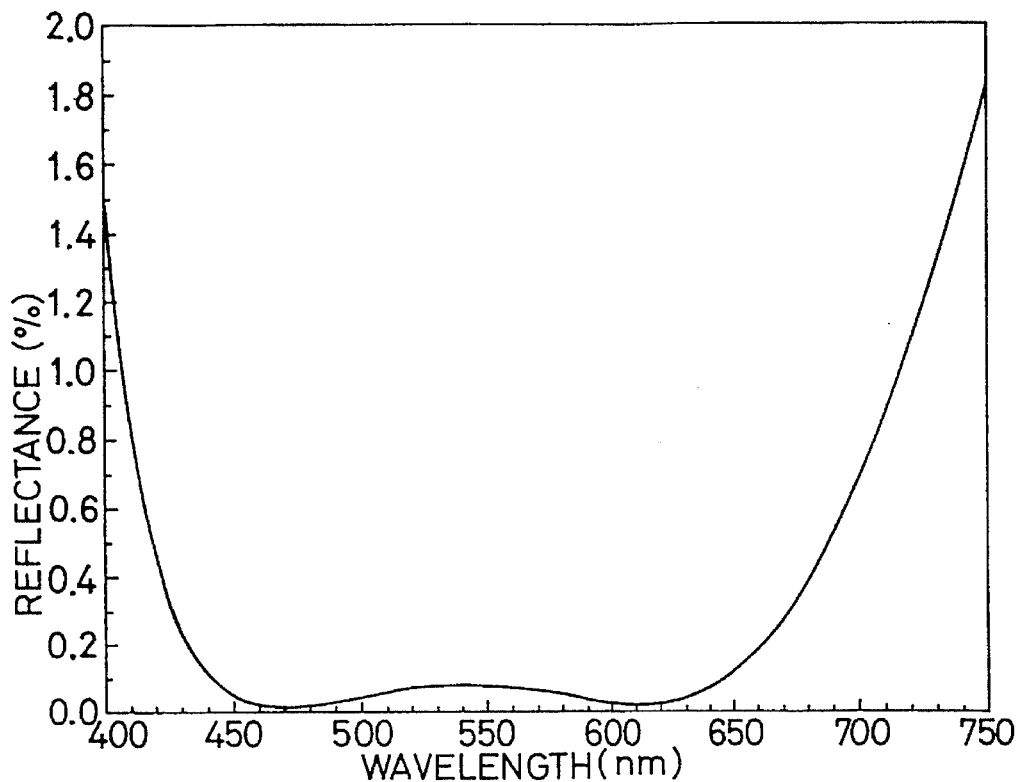
FIG. 15 is a graph showing the spectral reflectance of Comparative Example 3.

In Comparative Example 3, the k value of the second layer is set to be 0.008 so as to let the first to third layers have the equivalent optical admittance. According to Comparative Example 3, although excellent optical and electrical characteristics can be obtained, a scratch is made by a load of 300 gf in a scratch test. That is, Comparative Example 3 is inferior to Examples 1 to 8 in terms of film strength. Note that FIGS. 13 to 15 respectively show the spectral reflectances of Comparative Examples 1 to 3.

As is apparent from Table 1, the $k_i$ values which satisfy all the requirements associated with optical characteristics, electrical characteristics and film strength must be set in such a manner that the first layer as an ITO layer stacked on the surface of a transparent substrate satisfies $k_1 \geq 0.1$; the second layer as a metal oxide film which is stacked on the first layer and is transparent in the visible region satisfies $k_2 \geq 0.01$; the fourth layer stacked on the third layer on the second layer satisfies $1.97 \leq k_4 \leq 2.15$; and the fifth layer stacked on the fourth layer satisfies $0.93 \leq k_5 \leq 1.05$.

Figure 16:
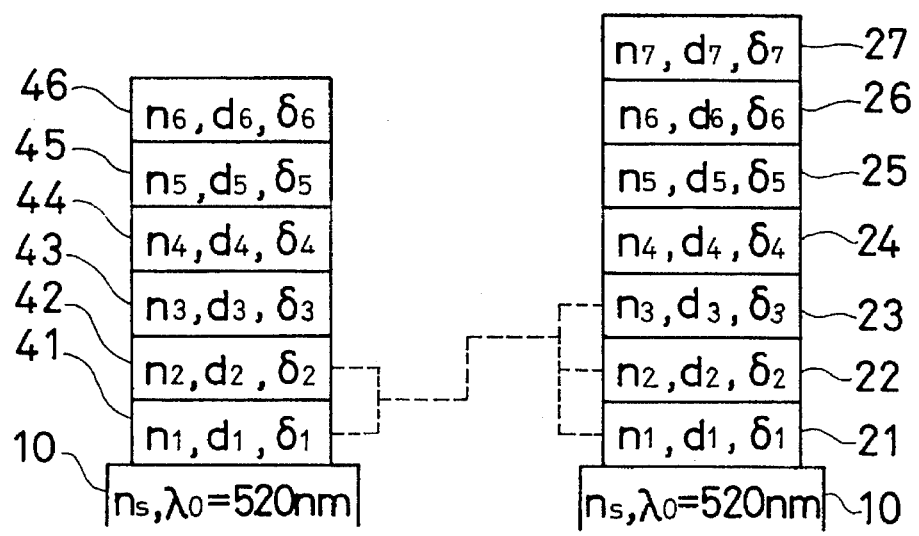
FIG. 16 is a view for explaining a seven-layered conductive antireflection film according to the second embodiment of the present invention.

A seven-layered conductive antireflection film according to the second embodiment of the present invention will be described next with reference to FIG. 16. In the optimal basic arrangement of a six-layered conductive antireflection film that satisfies the required optical and electrical characteristics, the k values of the first to sixth layers are defined as follows: $k_1=0.35$, $k_2=0.32$, $k_3=0.75$, $k_4=0.21$, $k_5=0.75$ and $k_6=1.08$, provided that a first layer 41, a second layer 42, a third layer 43, a fourth layer 44, a fifth layer 45 and a sixth layer 46 are stacked on a transparent substrate 10 in the order named, as shown in FIG. 16.

Figure 17:
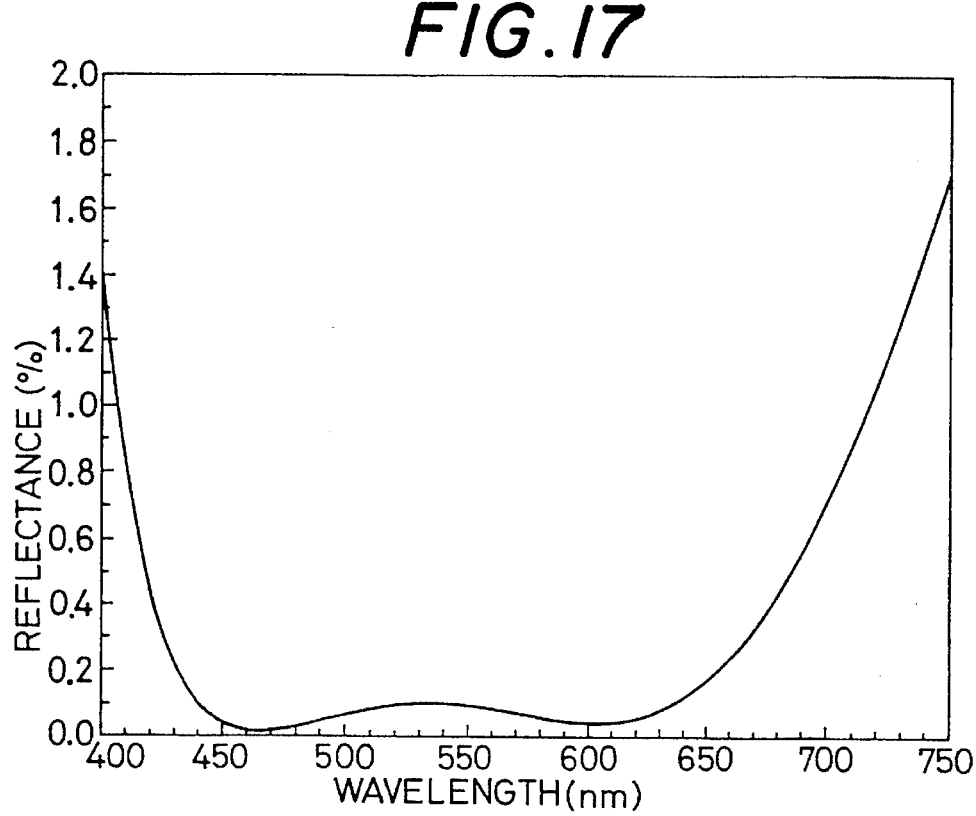
FIG. 17 is a view showing a basic six-layered film arrangement.

The preferable ranges of these $k_i$ values are:

$1.02 \leq k_6 \leq 1.12$ $0.68 \leq k_5 \leq 0.80$ $0.18 \leq k_4 \leq 0.24$ $0.70 \leq k_3 \leq 0.80$ $0.27 \leq k_2 \leq 0.37$ $0.30 \leq k_1 \leq 0.42$ FIG. 17 shows the spectral reflectance of the six-layered conductive antireflection film having this basic arrangement.

The seven-layered conductive antireflection film according to the second embodiment of the present invention is designed such that an optical admittance almost equivalent to that of the first and second layers 41 and 42 of the basic arrangement of the six-layered film is realized by a first layer 21, a second layer 22 as an adhesive layer and a third layer 23 of the seven-layered film in the same manner as in the case of the above-described development from the four-layered film to the five-layered film.

In this case, similar to the five-layered conductive antireflection film, the lower limit of the thickness of the adhesive layer as the second layer 22 is determined in consideration of film strength, whereas the upper limit of the thickness is determined in consideration of the sheet resistance (antistatic function) of an ITO layer as the first layer 21.

When the first and second layers 41 and 42 of the basic arrangement of the six-layered film are replaced with the three layers 21 to 23 having the equivalent optical admittance, as shown in FIG. 16, and conditions to be described later are satisfied, a conductive antireflection film according to the second embodiment of the present invention can be obtained.

Figure 18:
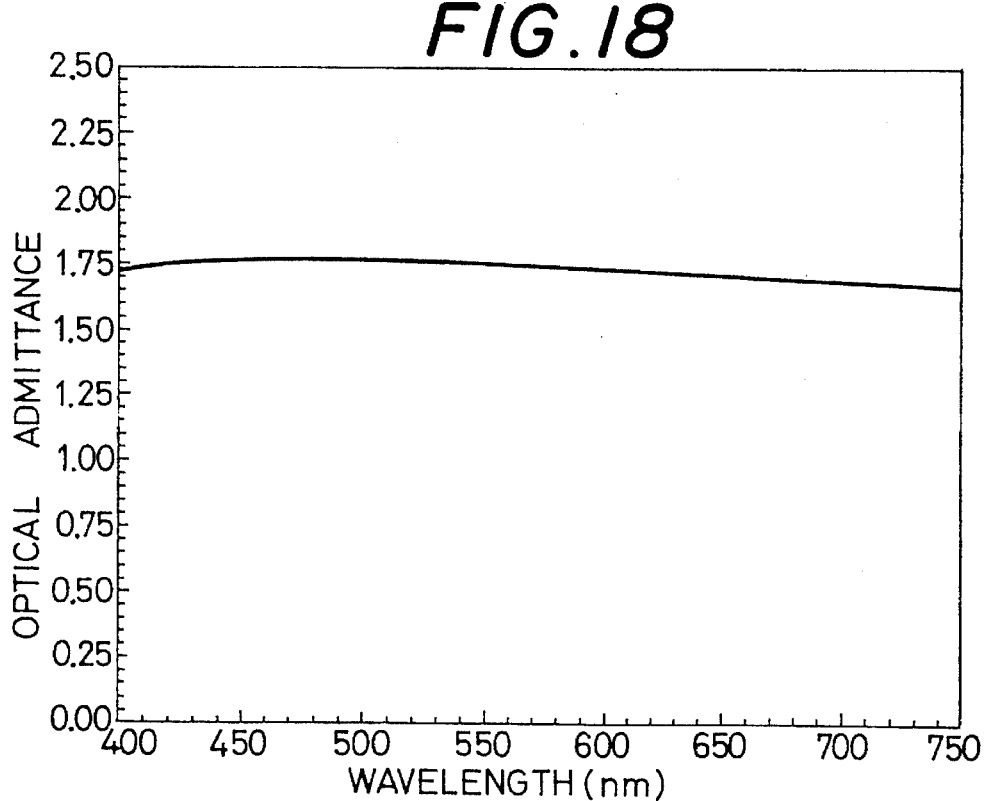
FIG. 18 is a graph showing the optical admittances of the basic six-layered film arrangement and Example 11.

FIG. 18 shows the optical admittance of the first and second layers 41 and 42 of the basic arrangement of the six-layered film, and that of the first to third layers 21 to 23 of Example 11 in Table 2. Referring to FIG. 18, the sold curve represents the optical admittance of the first and second layers of the basic arrangement of the six-layered film; and the broken curve, the optical admittance of the first to third layers of Example 11. These curve are superposed on each other. That is, the optical admittances are equivalent to each other.

Figure 19:
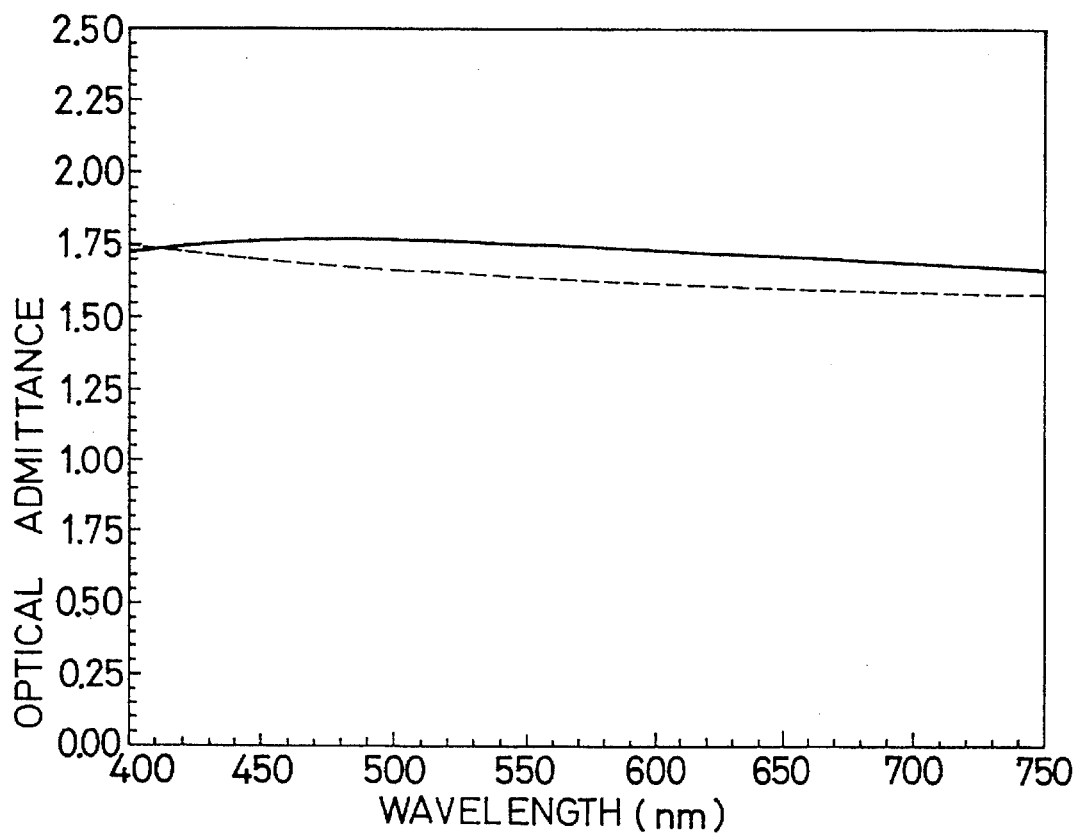
FIG. 19 is a graph showing the optical admittances of the basic six-layered film arrangement and Example 13.
Figure 20:
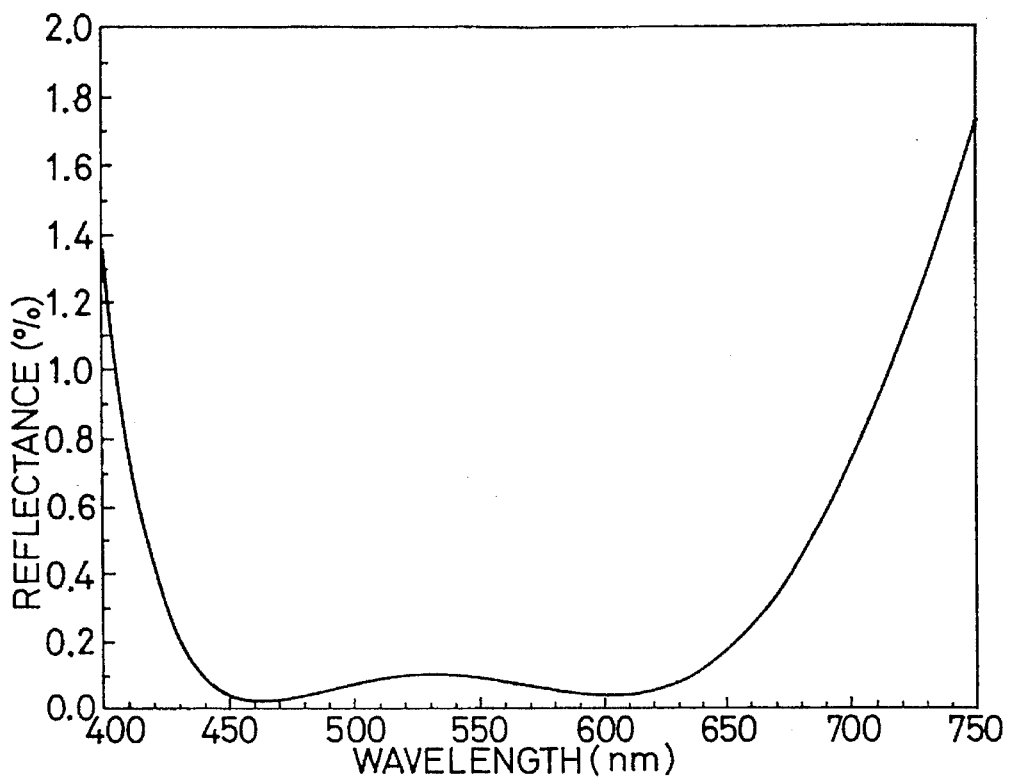
FIG. 20 is a graph showing the spectral reflectance of Example 9.
Figure 21:
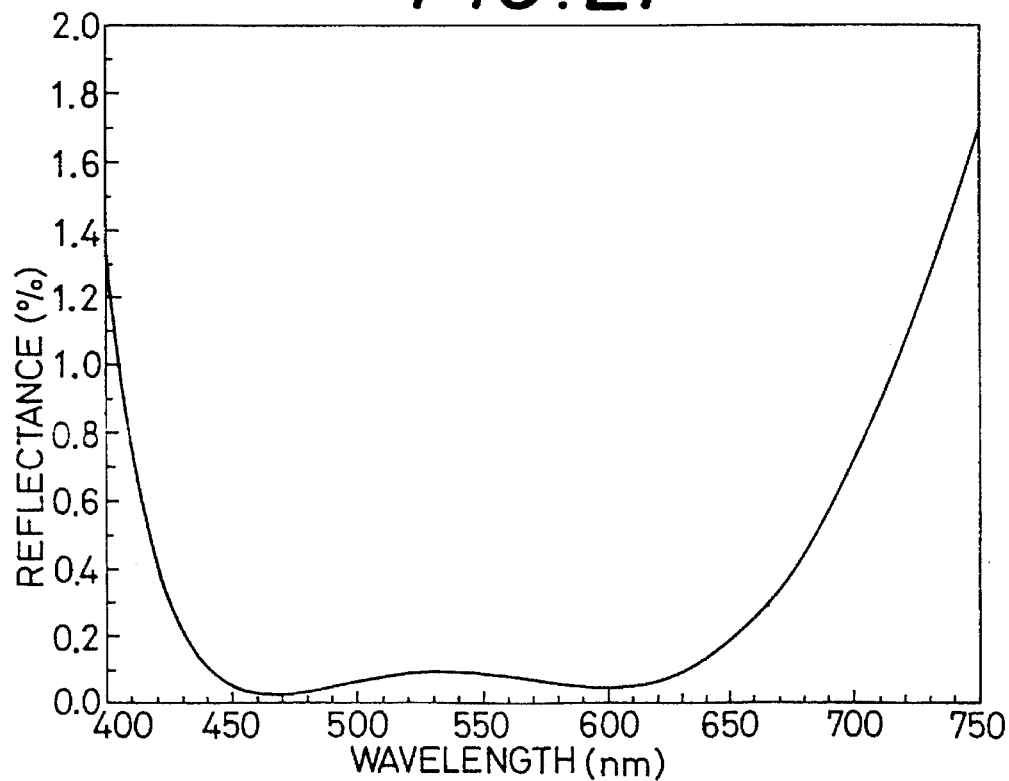
FIG. 21 is a graph showing the spectral reflectance of Example 10.
Figure 22:
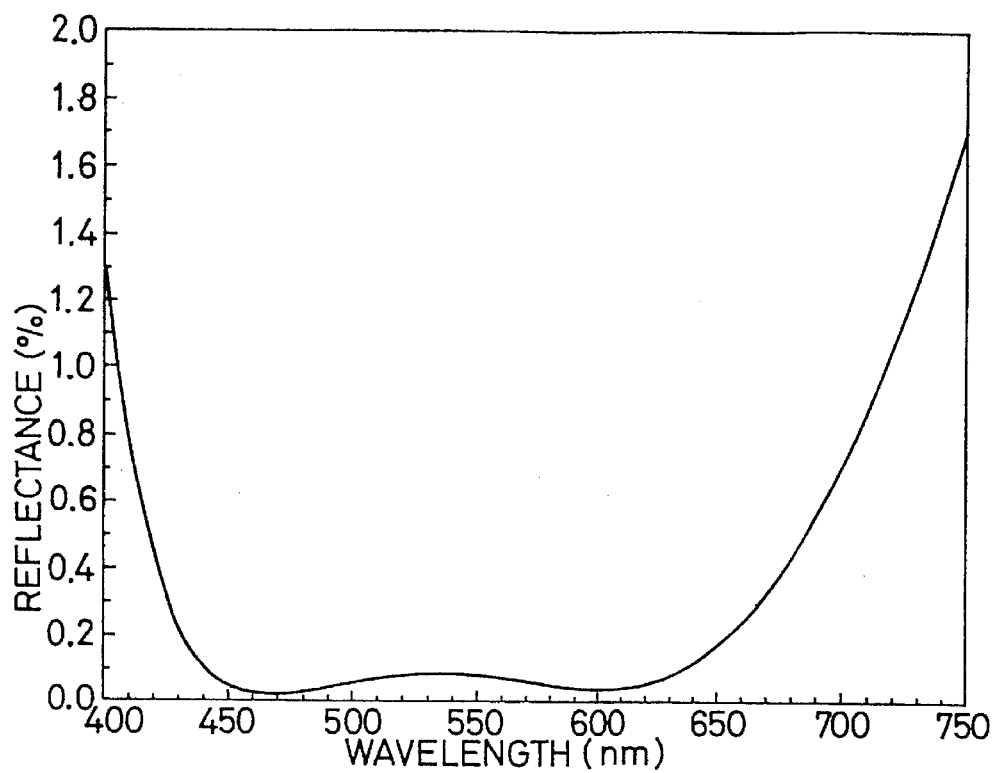
FIG. 22 is a graph showing the spectral reflectance of Example 11.
Figure 23:
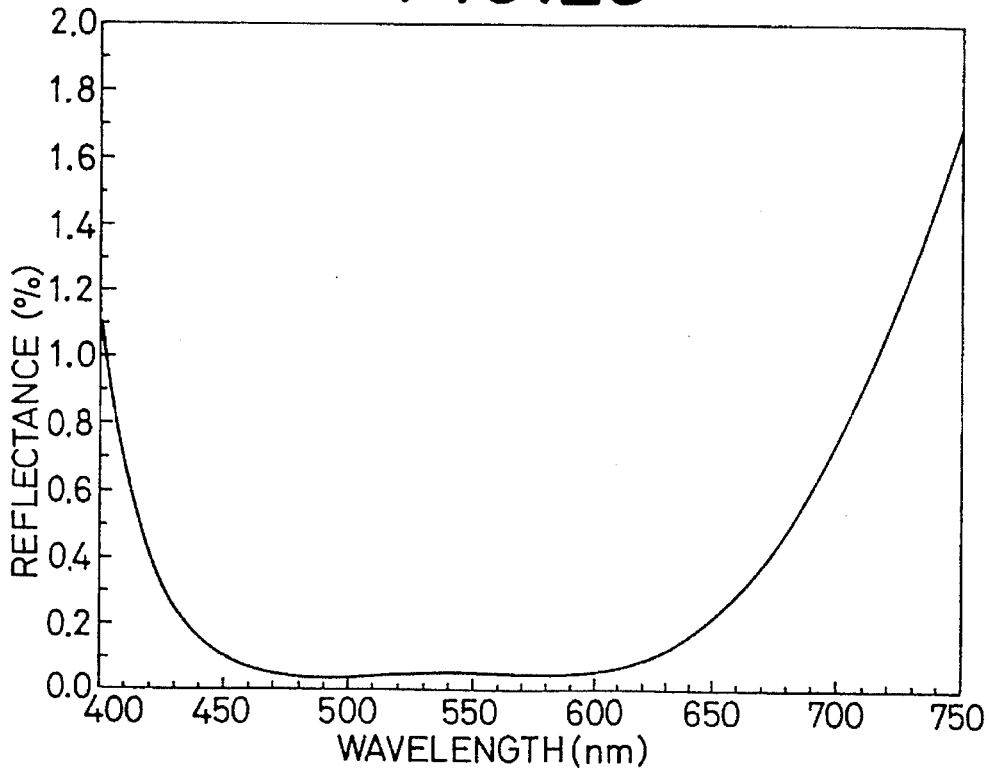
FIG. 23 is a graph showing the spectral reflectance of Example 12.
Figure 24:
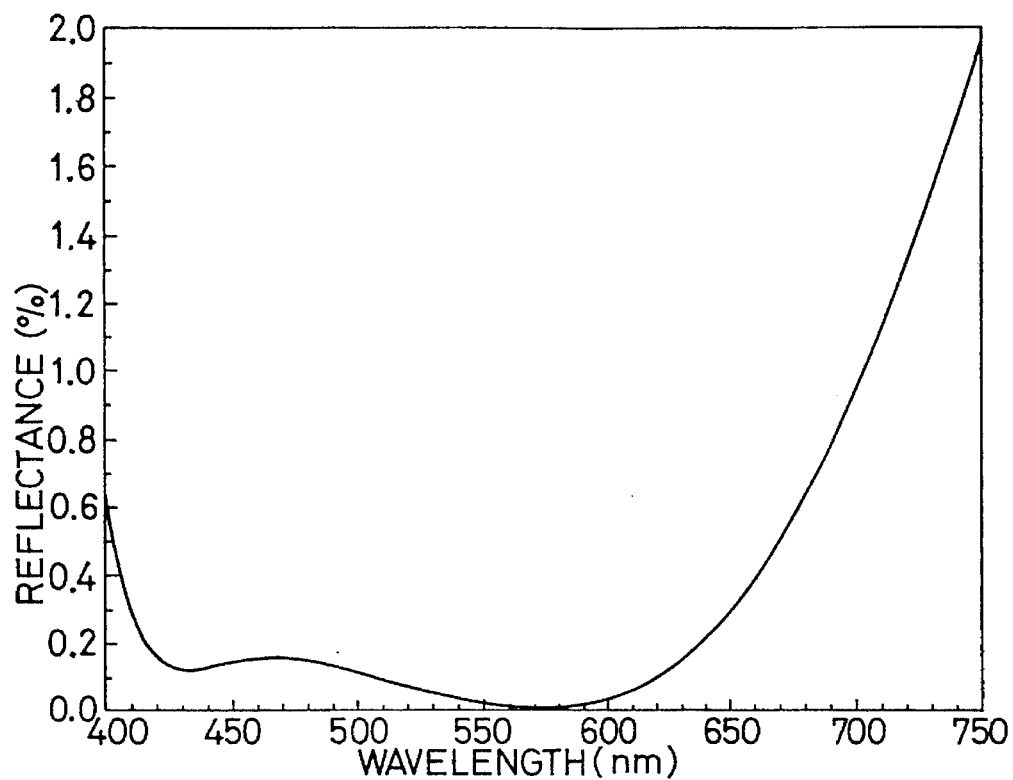
FIG. 24 is a graph showing the spectral reflectance of Example 13.
Figure 25:
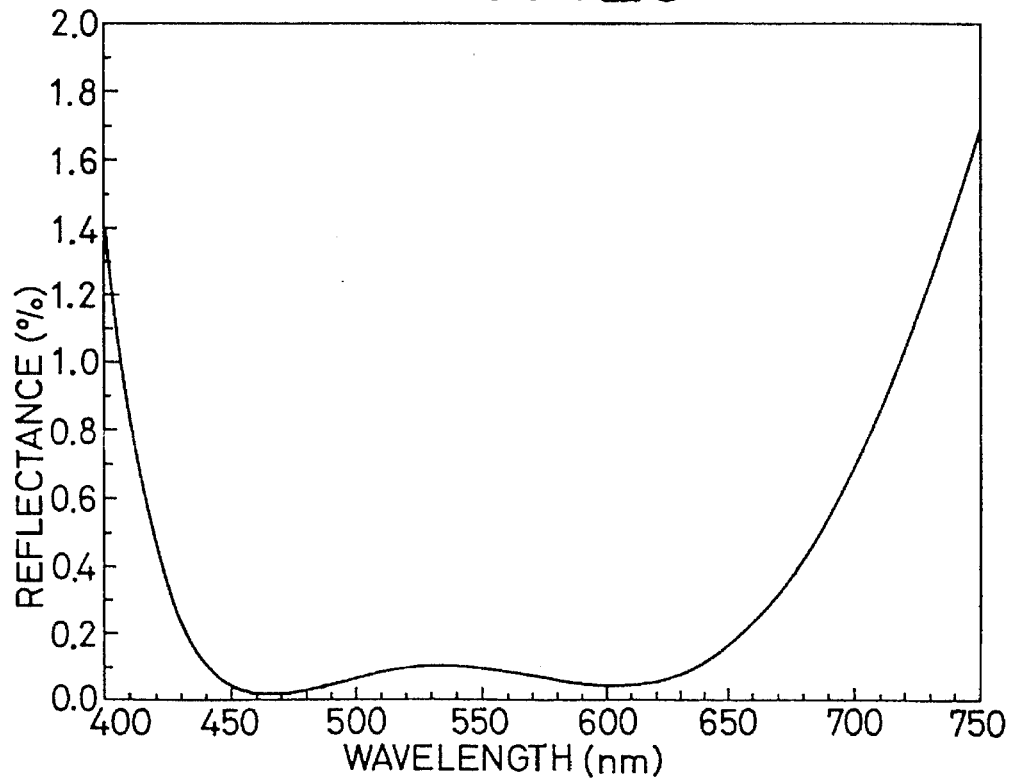
FIG. 25 is a graph showing the spectral reflectance of Example 14.
Figure 26:
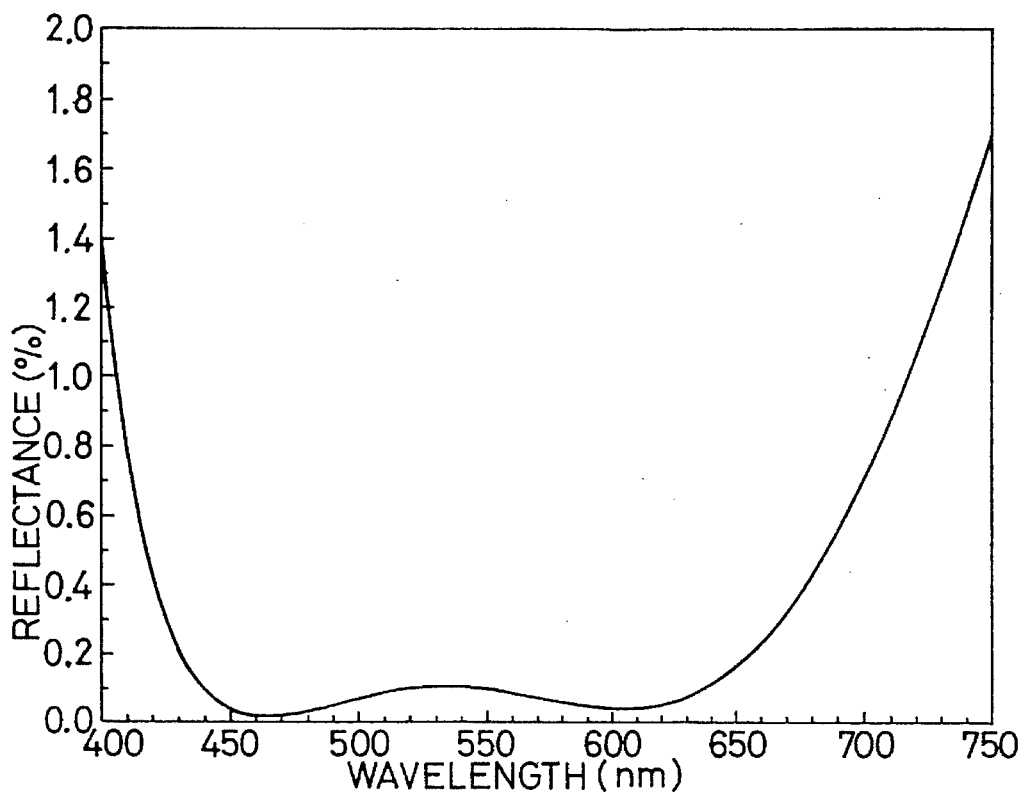
FIG. 26 is a graph showing the spectral reflectance of Example 15.
Figure 27:
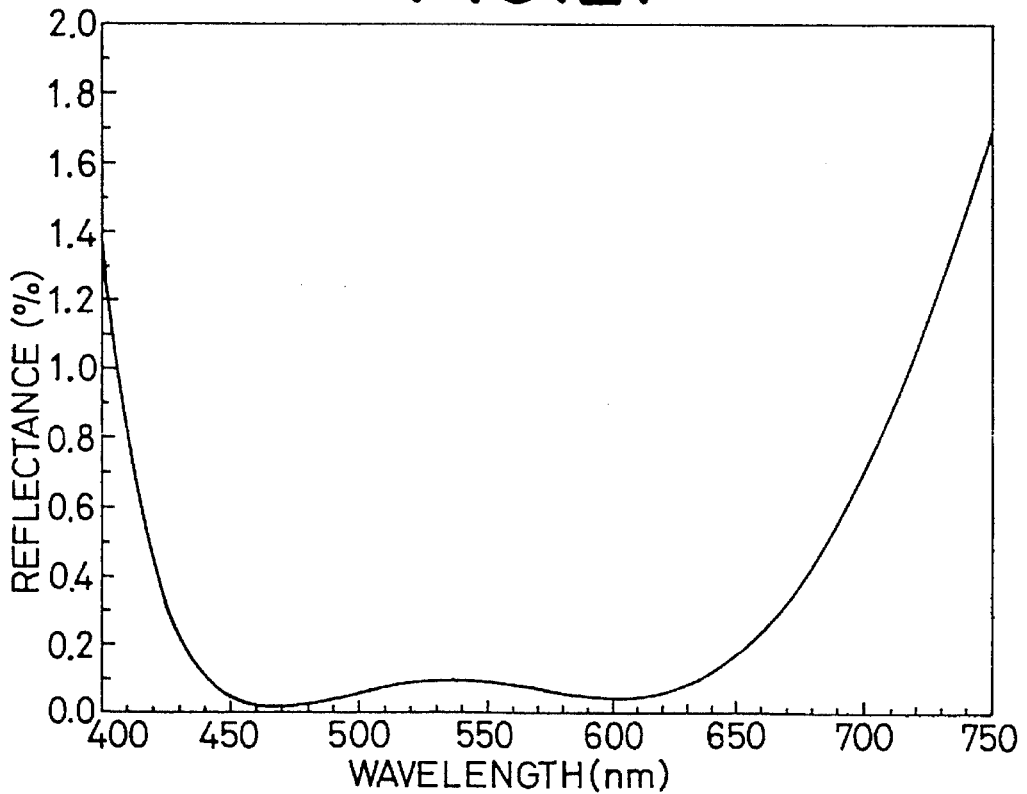
FIG. 27 is a graph showing the spectral reflectance of Example 16.

FIG. 19 shows the optical admittance of the first and second layers 41 and 42 of the basic arrangement of the six-layered film, and that of the first to third layers 21 to 23 of Example 13. Referring to FIG. 19, the solid curve represents the optical admittance of the first and second layers 41 and 42 of the basic arrangement of the six-layered film; and broken curve, the optical admittance of the first to third layers 21 to 23 of Example 13. These optical admittances are almost equivalent to each other. As is apparent from the spectral reflectance curve in FIG. 24, even with this degree of difference in optical admittance, a reflectance of 0.3% or less can be realized in the wavelength range of 430 nm to 650 nm.

As is apparent from Table 2, each of Examples 9 to 16 of the second embodiment has a high film strength while maintaining excellent optical and electrical characteristics. FIGS. 20 to 27 respectively show the spectral reflectances of Examples 9 to 16.

In contrast to this, Comparative Example 4 is designed such that the k value of the seventh layer of Example 11 is set to be a large value of 1.14. According to Comparative Example 4, although excellent electrical characteristics and a high film strength can be obtained, a reflectance of 0.3% or less cannot be realized in the wavelength range of 430 nm to 650 nm. That is, Comparative Example 4 is inferior to Example 11 in terms of optical characteristics.

In Comparative Example 5, the k value of the first layer is set to be 0.07 so as to let the first to third layers have the equivalent optical admittance. According to Comparative Example 5, although excellent optical characteristics and a high film strength can be obtained, an antistatic function cannot be obtained because the sheet resistance cannot be reduced. That is, Comparative Example 5 is inferior to Examples 9 to 16 in terms of electrical characteristics.

Figure 28:
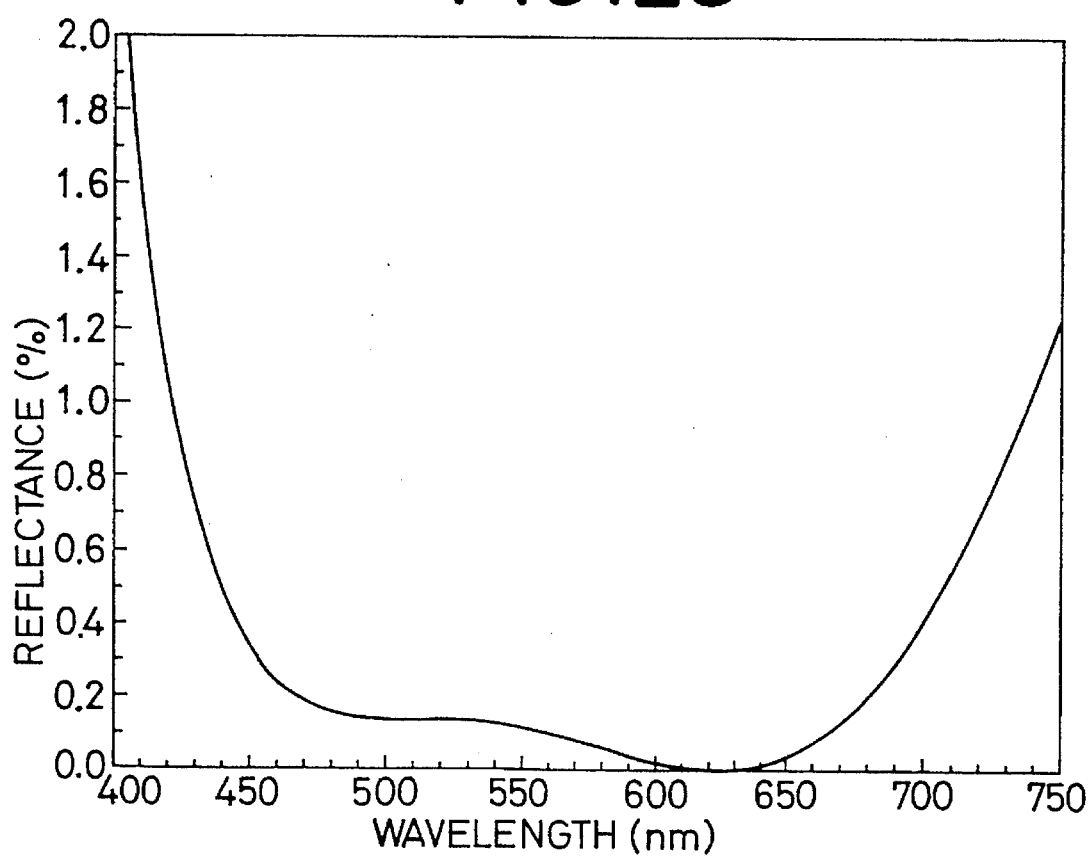
FIG. 28 is a graph showing the spectral reflectance of Comparative Example 4.
Figure 29:
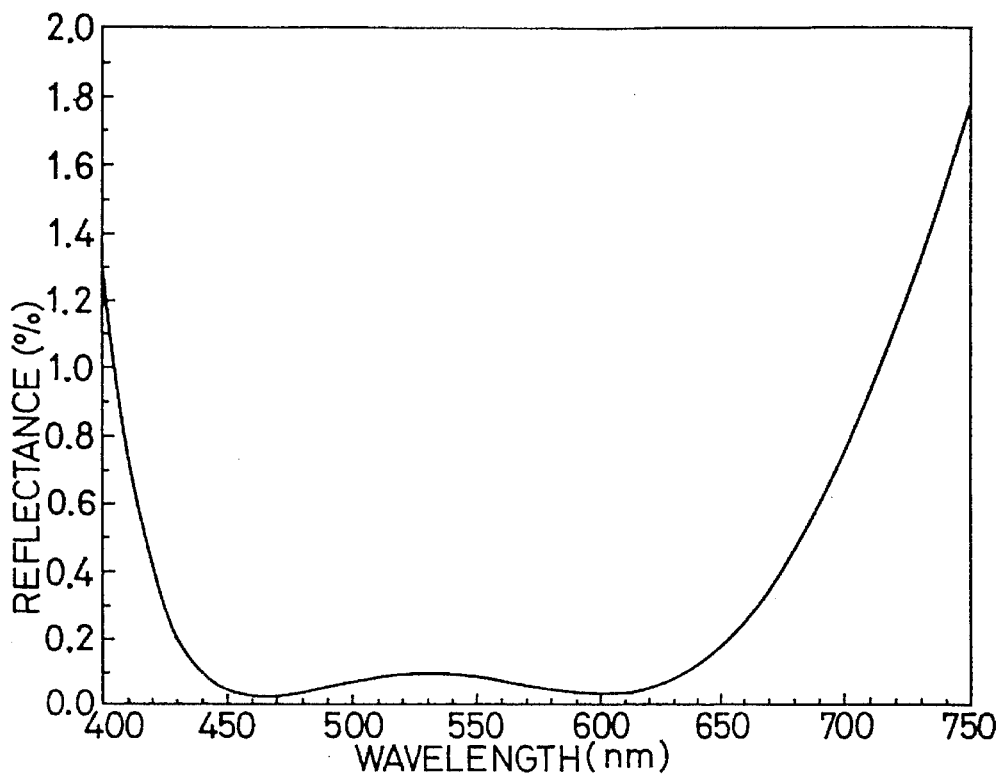
FIG. 29 is a graph showing the spectral reflectance of Comparative Example 5.
Figure 30:
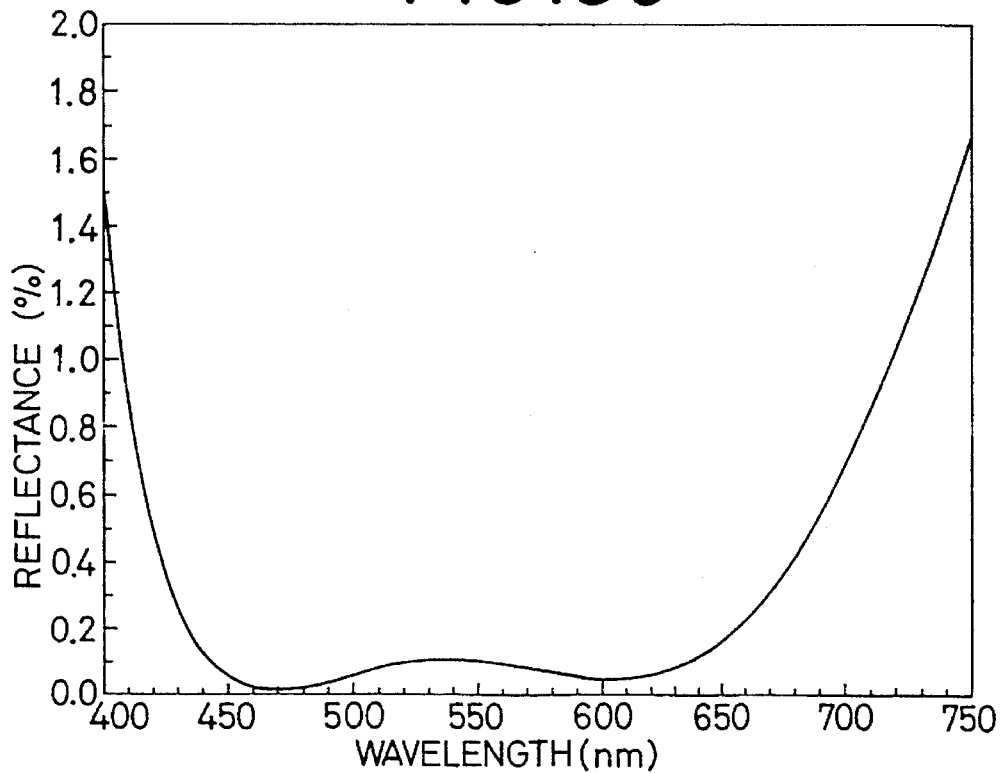
FIG. 30 is a graph showing the spectral reflectance of Comparative Example 6.

In Comparative Example 6, the k value of the second layer is set to be 0.008 so as to let the first to third layers have the equivalent optical admittance. According to Comparative Example 6, although excellent optical and electrical characteristics can be obtained, a scratch is made by a load of 300 gf in a scratch test. That is, Comparative Example 6 is inferior to Examples 9 to 16 in terms of film strength. Note that FIGS. 28 to 30 respectively show the spectral reflectance of Comparative Examples 4 to 6.

As is apparent from Table 2, the $k_i$ values which satisfy all the requirements associated with optical characteristics, electrical characteristics and film strength must be set in such a manner that the first layer as an ITO layer stacked on the surface of a transparent substrate satisfies $k_1 \geq 0.01$; the second layer as a metal oxide film which is stacked on the first layer and is transparent in the visible region satisfies $k_2 \geq 0.01$; the fourth layer stacked on the third layer on the second layer satisfies $0.07 \leq k_4 \leq 0.80$; the fifth layer stacked on the fourth layer satisfies $0.18 \leq k_5 \leq 0.24$; the sixth layer stacked on the fifth layer satisfies $0.68 \leq k_6 \leq 0.80$; and the seventh layer stacked on the sixth layer satisfies $1.02 \leq k_7 \leq 1.12$.

Note that the film thickness range of a given layer is determined as an allowable film thickness range based on the assumption that the thicknesses of the remaining layers are accurately controlled within the respective film thickness ranges defined in the basic arrangement of the film.

In the above-described case, when the wavelength is 520 nm, the refractive index of a $PrTiO_3$ layer is 2.15; the refractive index of an $SiO_2$ layer, 1.46; the refractive index of an $Al_2O_3$ layer, 1.63; and the refractive index of a $TiO_2$ layer, 2.35.

In the above-described embodiments, the respective layers were formed by the vacuum deposition. Table 3 shows the deposition conditions for the respective layers. Note that the respective layers may be formed by other methods such as sputtering upon changing the conditions.

TABLE 1

| | FILM ARRANGEMENT | | | | | ELEC CHRST | | |
|---|---|---|---|---|---|---|---|---|
| | 1ST LAYER | 2ND LAYER | 3RD LAYER | 4TH LAYER | 5TH LAYER | OPTICAL CHRST | (SHEET RES) ($\Omega/\square$) | FILM STRENGTH |
| EXAMPLE 1 | ITO 0.36 | $PrTiO_3$ 0.01 | $MgF_2$ 0.28 | $PrTiO_3$ 2.10 | $MgF_2$ 1.00 | ⊙ | ⊙ [156] | ○ |
| EXAMPLE 2 | ITO 0.30 | $PrTiO_3$ 0.05 | $MgF_2$ 0.30 | $PrTiO_3$ 2.10 | $MgF_2$ 1.00 | ⊙ | ⊙ [188] | ⊙ |
| EXAMPLE 3 | ITO 0.21 | $PrTiO_3$ 0.10 | $MgF_2$ 0.32 | $PrTiO_3$ 2.10 | $MgF_2$ 1.00 | ⊙ | ⊙ [268] | ⊙ |
| EXAMPLE 4 | ITO 0.12 | $PrTiO_3$ 0.15 | $MgF_2$ 0.34 | $PrTiO_3$ 2.10 | $MgF_2$ 1.00 | ⊙ | ○ [469] | ⊙ |
| EXAMPLE 5 | ITO 0.10 | $PrTiO_3$ 0.20 | $MgF_2$ 0.38 | $PrTiO_3$ 2.10 | $MgF_2$ 1.00 | ○ | ○ [563] | ⊙ |
| EXAMPLE 6 | ITO 0.37 | $SiO_2$ 0.05 | $MgF_2$ 0.23 | $PrTiO_3$ 2.10 | $MgF_2$ 1.00 | ⊙ | ⊙ [152] | ⊙ |
| EXAMPLE 7 | ITO 0.35 | $Al_2O_3$ 0.05 | $MgF_2$ 0.25 | $PrTiO_3$ 2.10 | $MgF_2$ 1.00 | ⊙ | ⊙ [161] | ⊙ |
| EXAMPLE 8 | ITO 0.28 | $TiO_2$ 0.05 | $MgF_2$ 0.31 | $PrTiO_3$ 2.10 | $MgF_2$ 1.00 | ⊙ | ⊙ [152] | ⊙ |
| COMPARATIVE EXAMPLE 1 | ITO 0.21 | $PrTiO_3$ 0.10 | $MgF_2$ 0.32 | $PrTiO_3$ 2.10 | $MgF_2$ 0.92 | X ⊙ | ⊙ | |
| COMPARATIVE EXAMPLE 2 | ITO 0.07 | $PrTiO_3$ 0.18 | $MgF_2$ 0.35 | $PrTiO_3$ 2.10 | $MgF_2$ 1.00 | ⊙ | X | ⊙ |
| COMPARATIVE EXAMPLE 3 | ITO 0.37 | $PrTiO_3$ 0.008 | $MgF_2$ 0.27 | $PrTiO_3$ 2.10 | $MgF_2$ 1.00 | ⊙ | ⊙ | X |
| | 1ST LAYER | 2ND LAYER | 3RD LAYER | 4TH LAYER | | | | |
| PRIOR ART | ITO 0.38 | $MgF_2$ 0.27 | $PrTiO_3$ 2.10 | $MgF_2$ 1.00 | | ⊙ | ⊙ | X |

TABLE 2

| | FILM ARRANGEMENT | | | | | | | ELEC CHRST | | |
|---|---|---|---|---|---|---|---|---|---|---|
| | 1ST LAYER | 2ND LAYER | 3RD LAYER | 4TH LAYER | 5TH LAYER | 6TH LAYER | 7TH LAYER | OPTICAL CHRST | (SHEET RES) ($\Omega/\square$) | FILM STRENGTH |
| EXAMPLE 9 | ITO 0.33 | $PrTiO_3$ 0.01 | $MgF_2$ 0.33 | $PrTiO_3$ 0.75 | $MgF_2$ 0.21 | $PrTiO_3$ 0.75 | $MgF_2$ 1.08 | ⊙ | ⊙ [171] | ○ |
| EXAMPLE 10 | ITO 0.27 | $PrTiO_3$ 0.05 | $MgF_2$ 0.35 | $PrTiO_3$ 0.75 | $MgF_2$ 0.21 | $PrTiO_3$ 0.75 | $MgF_2$ 1.08 | ⊙ | ⊙ [209] | ⊙ |
| EXAMPLE 11 | ITO 0.18 | $PrTiO_3$ 0.10 | $MgF_2$ 0.37 | $PrTiO_3$ 0.75 | $MgF_2$ 0.21 | $PrTiO_3$ 0.75 | $MgF_2$ 1.08 | ⊙ | ⊙ [313] | ⊙ |
| EXAMPLE 12 | ITO 0.11 | $PrTiO_3$ 0.15 | $MgF_2$ 0.39 | $PrTiO_3$ 0.75 | $MgF_2$ 0.21 | $PrTiO_3$ 0.75 | $MgF_2$ 1.08 | ⊙ | ○ [512] | ⊙ |
| EXAMPLE 13 | ITO 0.10 | $PrTiO_3$ 0.20 | $MgF_2$ 0.43 | $PrTiO_3$ 0.75 | $MgF_2$ 0.21 | $PrTiO_3$ 0.75 | $MgF_2$ 1.08 | ○ | ○ [563] | ⊙ |
| EXAMPLE 14 | ITO 0.34 | $SiO_2$ 0.05 | $MgF_2$ 0.28 | $PrTiO_3$ 0.75 | $MgF_2$ 0.21 | $PrTiO_3$ 0.75 | $MgF_2$ 1.08 | ⊙ | ⊙ [166] | ⊙ |
| EXAMPLE 15 | ITO 0.32 | $Al_2O_3$ 0.05 | $MgF_2$ 0.30 | $PrTiO_3$ 0.75 | $MgF_2$ 0.21 | $PrTiO_3$ 0.75 | $MgF_2$ 1.08 | ⊙ | ⊙ [176] | ⊙ |
| EXAMPLE 16 | ITO 0.25 | $TiO_2$ 0.05 | $MgF_2$ 0.36 | $PrTiO_3$ 0.75 | $MgF_2$ 0.21 | $PrTiO_3$ 0.75 | $MgF_2$ 1.08 | ⊙ | ⊙ [225] | ⊙ |
| COMPARATIVE EXAMPLE 4 | ITO 0.18 | $PrTiO_3$ 0.10 | $MgF_2$ 0.37 | $PrTiO_3$ 0.75 | $MgF_2$ 0.21 | $PrTiO_3$ 0.75 | $MgF_2$ 1.14 | X | ⊙ | ⊙ |
| COMPARATIVE EXAMPLE 5 | ITO 0.07 | $PrTiO_3$ 0.19 | $MgF_2$ 0.39 | $PrTiO_3$ 0.75 | $MgF_2$ 0.21 | $PrTiO_3$ 0.75 | $MgF_2$ 1.08 | ⊙ | X | ⊙ |
| COMPARATIVE EXAMPLE 6 | ITO 0.34 | $PrTiO_3$ 0.008 | $MgF_2$ 0.32 | $PrTiO_3$ 0.75 | $MgF_2$ 0.21 | $PrTiO_3$ 0.75 | $MgF_2$ 1.08 | ⊙ | ⊙ | X |

| | 1ST LAYER | 2ND LAYER | 3RD LAYER | 4TH LAYER | 5TH LAYER | 6TH LAYER | | | |
|---|---|---|---|---|---|---|---|---|---|
| PRIOR ART | $PrTiO_3$ 0.35 | $MgF_2$ 0.32 | $PrTiO_3$ 0.75 | $MgF_2$ 0.21 | $PrTiO_3$ 0.75 | $MgF_2$ 1.08 | ⊙ | ⊙ | X |

TABLE 3

| LAYER MATERIAL | RESIDUAL GAS (Pa) | DEPOSITION RATE (nm/sec) | OXYGEN PARTIAL PRESSURE (Pa) | SUBSTRATE TEMP (°C.) | VAPOR SOURCE |
|---|---|---|---|---|---|
| $MgF_2$ | $<1.3 \times 10^{-3}$ | 1.1 | — | 300 | $MgF_2$ |
| $PrTiO_3$ | $<1.3 \times 10^{-3}$ | 0.8 | $1.0 \times 10^{-2}$ | 300 | $PrTiO_3$ |
| ITO | $<1.3 \times 10^{-3}$ | 0.05 | $8.0 \times 10^{-2}$ | 300 | ITO |
| $SiO_2$ | $<1.3 \times 10^{-3}$ | 1.0 | — | 300 | $SiO_2$ |
| $Al_2O_3$ | $<1.3 \times 10^{-3}$ | 0.5 | $1.0 \times 10^{-2}$ | 300 | $Al_2O_3$ |
| $TiO_2$ | $<1.3 \times 10^{-3}$ | 0.3 | $1.3 \times 10^{-2}$ | 300 | $Ti_2O_3$ |

What is claimed is:

1. A conductive antireflection material comprising:

a transparent substrate;

a first layer composed of an ITO film which is stacked on a surface of the transparent substrate to satisfy $0.1 \leq k_1$ when $k_i = 4n_i d_i / \lambda_o$ where $n_i$ is a refractive index of an ith layer, $d_i$ is a geometric thickness of the ith layer, and $\lambda_o$ is a middle wavelength in design;

a second layer composed of a metal oxide film which is stacked on said first layer to satisfy $0.01 \leq k_2$ and is transparent in a visible region;

a third layer composed of an $MgF_2$ film stacked on said second layer;

a fourth layer stacked on said third layer to satisfy $1.97 \leq k_4 \leq 2.15$; and a fifth layer stacked on said fourth layer to satisfy $0.93 \leq k_5 \leq 1.05$.

2. A material according to claim 1, wherein said fifth layer is an $MgF_2$ film.

3. A material according to claim 1, wherein said fourth layer is composed of a compound selected from the group consisting of $PrTiO_3$, $TiO_2$, $ZrTiO_4$, $ZrO_2$ and $Ta_2O_5$.

4. A material according to claim 1, wherein said transparent substrate is a glass substrate.

5. A material according to claim 1, wherein said metal oxide film is selected from the group consisting of a $PrTiO_3$ film, an $SiO_2$ film, and an $Al_2O_3$ film.

* * * * *